United States Patent

Balsells et al.

[11] Patent Number: 5,992,856
[45] Date of Patent: Nov. 30, 1999

[54] ROTARY, RECIPROCATING SEALS WITH DOUBLE SPRING AND SEPARATING BAND RINGS

[75] Inventors: Peter J. Balsells, Santa Ana; Daniel D. Poon, Westminster, both of Calif.

[73] Assignee: Bal Seal Engineering Company, Inc., Santa Ana, Calif.

[21] Appl. No.: 08/989,489

[22] Filed: Dec. 12, 1997

[51] Int. Cl.⁶ .................................................... F16J 15/32
[52] U.S. Cl. ............................................. 277/553; 277/564
[58] Field of Search .................................. 277/554, 553, 277/562, 564, 567

[56] References Cited

U.S. PATENT DOCUMENTS

| | | | |
|---|---|---|---|
| 2,162,104 | 6/1939 | Mosher | 277/554 X |
| 2,168,818 | 8/1939 | Condon | 277/564 X |
| 2,888,281 | 5/1959 | Ratti | 277/554 |
| 3,156,474 | 11/1964 | Nelson | 277/554 |
| 5,433,456 | 7/1995 | Nicholson | 277/553 X |
| 5,791,657 | 8/1998 | Cain et al. | 277/554 X |
| 5,860,680 | 1/1999 | Driiver et al. | 277/564 X |

*Primary Examiner*—James R. Brittain
*Assistant Examiner*—Lewis Nguyen
*Attorney, Agent, or Firm*—Walter A. Hackler

[57] ABSTRACT

A seal assembly suitable for static, rotary and reciprocating sealing between the shaft and the housing is provided and includes a seal ring in the shape of an annulus having a body portion with an inside flange and an outside flange extending axially therefrom and establishing a ring seal cavity therebetween. An inside annular spring is disposed in the cavity for biasing the inside flange against the shaft to provide the dynamics seal therebetween. An outside annular spring is also disposed in the cavity for biasing the outside flange against the housing to provide a static seal therebetween and prevent the rotation of the seal ring. A band is disposed in the cavity in between the inside and outside springs for enabling the inside and outside springs to independently bias the inside flange and outside flange, respectively.

20 Claims, 2 Drawing Sheets

ROTARY, RECIPROCATING SEALS WITH DOUBLE SPRING AND SEPARATING BAND RINGS

The present invention is generally directed to seal assemblies and more particularly directed to rotary, reciprocating seals.

Seals disposed between a rotating shaft and the housing must provide a dynamic (rotary, reciprocating) seal against the shaft and a static seal against the housing. Naturally, this leads to difficulty in providing the proper forces against a seal ring for both retaining the seal in the shaft against the housing without rotation of the seal ring, while at the same time, providing the proper force to effect sealing on the dynamic portion of the seal. Thus, because of the differences between the dynamic and the sealing requirements, it is preferable that the inside diameter seal be isolated from the outside diameter seal.

One solution to this problem is the use of a metal band incorporated into the seal ring to provide force for the static seal and an annular coil spring utilized to provide force necessary for dynamic sealing of the seal ring against the shaft.

It is desirable that the static sealing force and the dynamic sealing force are independent of one another. For example, if forces necessary to effect static sealing between a seal ring and housing are transmitted to an inside diameter thereof of the seal, abutting a shaft, the friction therebetween can be affected in a manner increasing seal wear and loss of seal life.

The present invention through the use of two separate and distinct springs, has the advantage of applying different and separated forces for static and dynamic sealing. That is, the present invention provides a design for a seal ring assembly, such that spring forces may be applied for dynamic and static sealing that are independent of one another.

SUMMARY OF THE INVENTION

A seal assembly, in accordance with the present invention, suitable for static rotary and reciprocating sealing between the shaft and a housing generally includes a seal ring in the shape of an annulus having a body portion with an inside flange and an outside flange extending axially therefrom and establishing a seal ring cavity therebetween.

An inside annular spring disposed in the cavity provides a means for biasing the inside flange against the shaft to provide a dynamic seal therebetween. In addition, an outside annular spring disposed in the cavity provides a means for biasing the outside flange against the housing to provide a static seal therebetween and prevent rotation of the seal ring when the shaft is rotated and/or reciprocated.

Importantly, a band disposed in the cavity in between the inside and outside springs provides a means for enabling the inside and outside spring to independently bias the inside flange and the outside flange, respectively. As hereinafter described in greater detail, the band is designed so that the force applied by either the inside or the outside spring will not deform the band and thus are not able to transmit a force from one band to another. Thus, the outside spring may provide a higher force to maintain intimate contact between a seal outside diameter and housing which is sufficient to retain the seal and provide appropriate sealing between the outside flange in order to prevent the seal ring from moving radially or axially under various conditions of temperature, speed, of the shaft and pressures.

In one embodiment of the present invention, the band may be fixed to the body portion of the seal ring and more particularly when the seal ring is formed from a metal, the band may be intrical therewith.

Another embodiment of the present invention, the band may be unattached within the cavity and include a groove means for preventing axial movement of the band means between the inside and outside springs. More particularly, the groove means may include a first groove on one side of the band which conforms to a perimeter of the inside of the spring, and the second groove on the opposite side of the band which conforms to a perimeter of the outside spring.

In another embodiment of the present invention a second band means may be disposed between the outside spring and the outside flange for maintaining the seal ring within the housing. The force provided by the second band means acts in concert with the outside spring for this purpose.

In order to tailor the static and dynamic sealing, the outside annular spring and the inside annular spring may have different force-deflection characteristics. In particular, the outside annular spring means and the inside annular spring means may be of different dimensions, size, type or material of construction.

It should be appreciated that the band disposed in the seal ring cavity effectively defines an inside and outside compartment within the cavity for accepting the inside annular spring and the outside annular spring, respectively. It should also be appreciated that the compartment sizes may also be different for accommodating different sizes and types of springs.

BRIEF DESCRIPTION OF THE DRAWINGS

The advantages and features of the present invention will appear from the following description, when considered in conjunction with the accompanying drawings, in which:

Turning now to FIG. 1 there is shown a seal assembly 10 in accordance with the present invention for providing static, rotary and reciprocating sealing between a shaft 12 and the housing 14.

Figure 1:
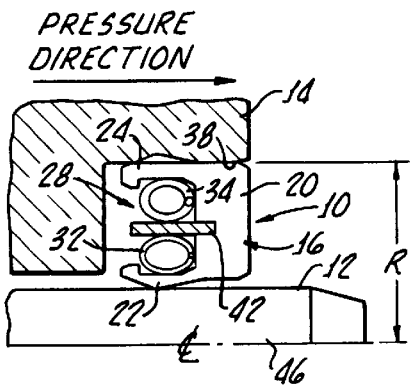
FIG. 1 is a cross sectional view of a seal assembly in accordance with the present invention generally showing a seal ring as it may be disposed between a shaft and a housing along with an inside annular spring disposed in the seal ring cavity with an outside annular spring and a band disposed therebetween.

In general, the seal assembly 10 includes a seal ring 16 which may be formed from any suitable material, such as, for example, polytetrafluoroethylene, or the like, having a body portion 20 with an inside flange 22 and an outside flange 24 extending axially therefrom which establish a seal ring cavity 28 between the inside flange 22 and the outside flange 24.

A dynamic seal is established between the inside flange 22 and the shaft 12 by an inside annular spring 32 which provides a means for biasing the inside flange 22 against the shaft 12 and outside annular spring 34 disposed in the cavity 28 provides a means for biasing the outside flange 24 against the surface 38 of the housing 14 to provide a static seal therebetween and prevent rotation of the seal ring 16 upon rotation of the shaft 12.

A linear band 42 having planar sides is disposed in the cavity 28 in between the inside spring 32 and the outside spring 34 for enabling the inside and outside springs to independently bias the inside flange 22 and outside flange 24, respectively. The band may be formed of metal or plastic and provides a separation of force developed in each spring 32, 34, so that the force applied by either spring 32, 34 is independent of the other and can be controlled to suit the particular needs of the sealing area where it is applied. For example, the outside flange may have a larger spring wire dimension or coil spacing (not shown) than the inside coil 32 in order to maintain the seal ring 16 between the shaft 12 and the housing 14 without affecting the spring loading characteristics on the inside flange 22.

As hereinabove noted, this arrangement can significantly affect seal ring life because unnecessary force is not applied between the inside flange 22 and the shaft 12 due to forces generated by the outside spring 34 which may be necessary to maintain a static seal between the outside flange 24 and the housing 14 and, of course, maintain the position of the seal ring 16 between the shaft 12 and the housing 14.

As a specific example, for a seal ring 16 having a radius R measured from a center line 46 of about 0.40 inches, the inside spring may be a canted coil spring formed from a wire of about 0.005 mills and the outside spring 34 may be a canted coil spring formed from wire having a diameter of about 0.008 mills. The band 42 may have a thickness of about 0.006 inches and may be fixed to the body 20 in any suitable fashion. This type of seal is suitable for pressures up to about 25 psi.

Figure 2:
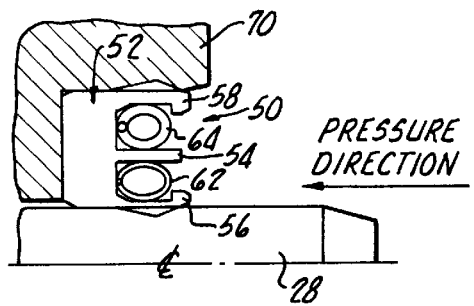
FIG. 2 is another embodiment of the present invention in which the seal ring and band are integrally formed from a metal or plastic.

Alternatively, as shown in FIG. 2, a seal assembly 50 include a body portion 52 and a band 54 integrally formed therein along with an inside flange 56 and an outside flange 58 extending axially therefrom an inside spring 62 and an outside spring 64 are provided for biasing the inside flange 56 and outside flange 58 for providing a dynamic seal against a shaft 68 and a housing 70 as hereinbefore described in connection with the seal ring assembly 10 shown in FIG. 1. The seal ring assembly 50 being formed of metal is suitable for applications in which the pressure may be up to about 25 psi or more.

In the case of a plastic for high temperature applications, the material of the ring would be made form a high-performance polymer with a flexural modulus, approximately 10 times that of PTFE. For example, the flexural modulus of PTFE is between 50,000 to 90,000. The flexural modulus of a typical high-performance polymer material is approximately 580,000 or approximately 10 times greater than PTFE. These materials have very low elongation—generally between 10 and 80 percent elongation versus 350 percent for PTFE. However, at 482° F., the flexural modulus for a high performance polymer is approximately 43,500 whereas the flexured modulus for PTFE is zero.

At lower temperatures, a PTFE based material, the band 54, would be thicker or have a high percentage of filler to avoid transmission of force between the springs 62, 64.

Figure 3:
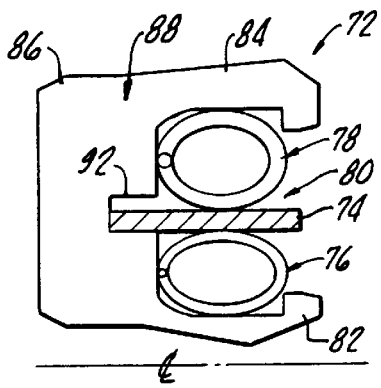
FIG. 3 is an alternative embodiment of the present invention in which the band is unattached to the seal ring.

Turning now to FIG. 3 there is shown another embodiment of a seal assembly 72 in accordance with the present invention which includes a floating metal band 74 disposed between an inner spring 76 and an outer spring 78 with an AC seal ring cavity 80 established between an inner flange 82 and outer flange 84 extending axially from a body portion 86 of a seal ring 88.

In this embodiment 72, the body portion 86 includes a slot 92 which provides for limited movement of the band 74 within the cavity 80 which can provide for additional control and balance of the forces exerted by the inner and outer springs 76, 78 against the flanges 82, 84, respectively, in order to achieve optimum static sealing and retention of the seal ring 88 within the housing (not shown in FIG. 3) and dynamic sealing between the flange 82 between a shaft (not shown in FIG. 3). As shown in FIG. 3, the outer spring 78 may have a greater spring wire cross section than the inner spring 76.

Figure 4:
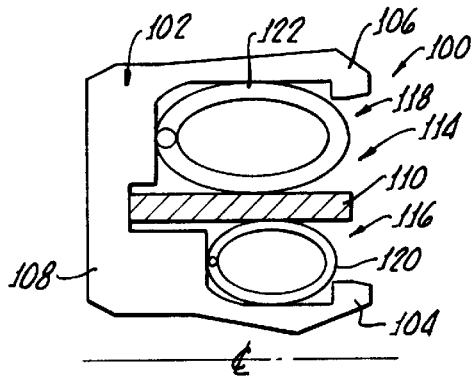
FIG. 4 is yet another embodiment of the present invention showing different size compartments within the seal ring cavity for accepting different sized springs therein.

Another embodiment 100 of the seal assembly is shown in FIG. 4 which includes a seal ring 102 having an inner flange 104 and an outer flange 106 depending from a body portion 108. As shown, a band 110 divides a seal ring cavity 114 into an inner compartment 116 and an outer compartment 118 with an inner spring 120 being disposed in the inner compartment 116 and an outer spring 122 being disposed in the outer compartment 118.

This embodiment 100 is distinguished by the fact that the body portion 108 having a shoulder 126 in combination with the band 110, establish the inner compartment 116 with smaller dimensions than the outer compartment 118. Thus, further control over the balance of sealing forces between the inner flange 104 and shaft (not shown in FIG. 4) and outer flange 106 in housing (not shown in FIG. 4) by accommodating springs 121, 122 of different sizes. It should be appreciated that this provides a further enhancement of the sealing forces that can be achieved by the seal assembly 100 in accordance with the present invention.

Figure 5:
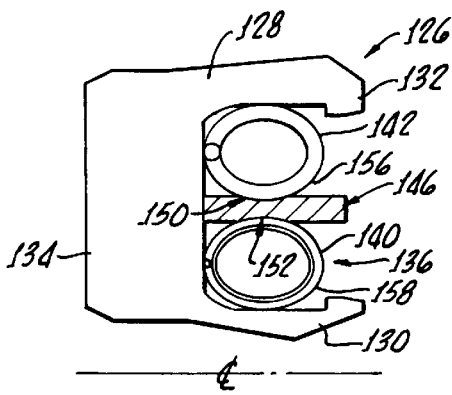
FIG. 5 is yet another embodiment of the present invention in which the grooves are provided on the band for preventing axial movement of the band within the seal ring cavity.

Turning now to FIG. 5, there is shown yet another embodiment 126 in accordance with the present invention which includes a seal ring 128 having an inner flange 130 and an outer flange 132 extending from a body portion 134 which establish a cavity 136 between the inner and outer flanges 130, 132, disposed within the cavity are springs 140, 142, separated by a band 146. In this embodiment 126, the band 146 includes grooves 150, 152 which provide a means for preventing axial movement of the band 146 within the cavity 136. More particularly, the band 150 conforms to a perimeter 156 of the outer spring 142 and the groove 152 conforms to a perimeter 158 of the inside spring 140. In this embodiment 126 no attachment occurs between the band 146 and the body portion 134, with all axial movement of the band 146 between the springs 140, 142 being prevented by the grooves 150, 152 contacting the perimeters 156, 158.

Figure 6:
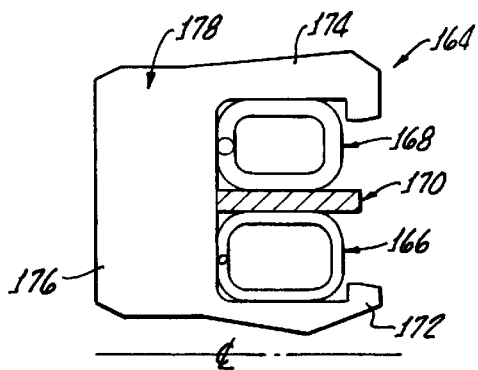
FIG. 6 is an alternative embodiment of the present invention showing the use of rectangular springs.

Yet another embodiment 164 of a seal assembly is shown in FIG. 6 in which canted coil springs 166, 168 have a square/rectangular cross section with the spring 168 having a higher force than the spring 166. A band 170 is positioned between the springs 166, 168 as hereinabove discussed between an inner flange 172 and an outer flange 174 extending from a body portion 176 of a ring seal 178.

Figure 7:
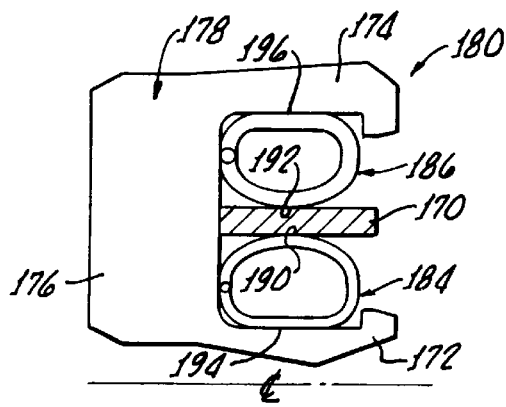
FIGS. 7–12 show cross sections of various other embodiments of the invention utilizing different spring types having various shapes and sizes which may be filled with elastomers to control, or adjust the sealing forces exerted against the inside and outside flanges of the seal ring.

The seal assembly 180, shown in FIG. 7, is similar to that shown in FIG. 6 with character references indicating identical or similar parts. In this embodiment 180, the semirectangular springs 184, 186 contact the metal band 170 at two points, 190, 192 to commit better alignment of the load developed by the spring bearing on the flanges 172, 174, respectively, by relatively flat portions 194, 196.

Figure 8:
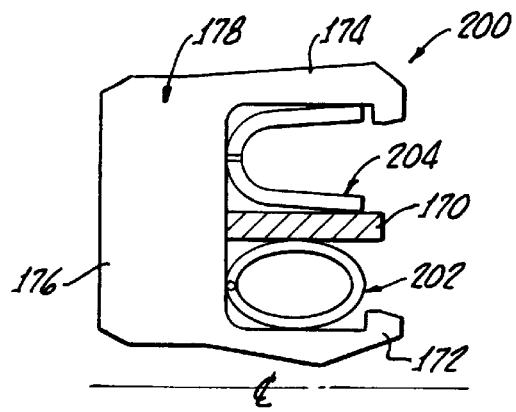

The seal assembly 200 shown in FIG. 8 includes an inner elliptical canted coil spring 202 and a U-shaped outer spring 204 utilized to further control or tailor the force distribution between flanges 172, 174. FIG. 8 identical character references refer to identical or similar features of the seal assembly 20 as hereinbefore discussed in connection with FIG. 7.

Figure 9:
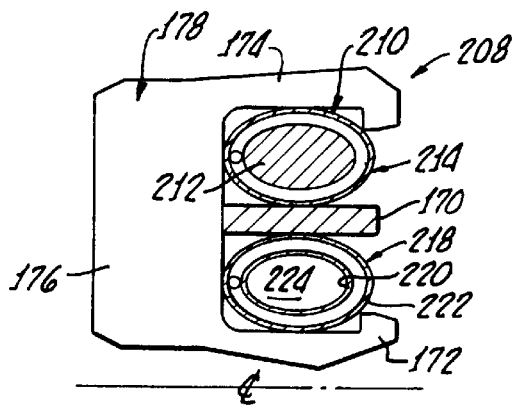

The spring assembly 208 shown in FIG. 9 utilizes an outer canted coil elliptical spring 210 filled with an elastomer 212 which includes a portion 214 protruding beyond the spring 210 around the periphery of the spring 210. An inner canted coil elliptical spring 218 is provided and filled with elastomer 220 with a portion 222 beyond the spring 218 around the periphery of the spring 218. In this embodiment 208 the elastomer 220 has a hollow center 224. This embodiment 208 illustrates a number of spring variations which can be utilized by the seal ring 178 for accommodating for various conditions of temperature, pressure, etc.

Figure 10:
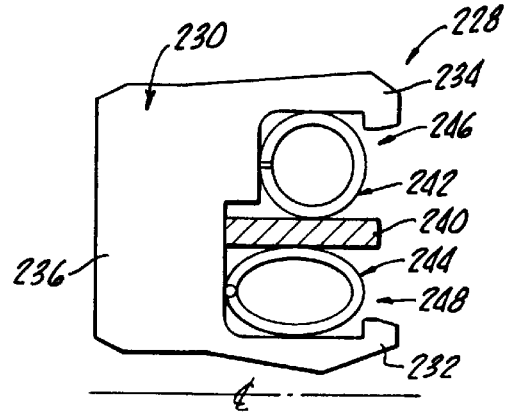

FIG. 10 shows a seal assembly 228 having a seal ring 230 with an inner flange 232 and an outer flange 234 extending from a body portion 236, a floating metal band 240 is disposed between a helical ribbon spring 242 and a light canted coil spring 244 disposed in an outer compartment 246 and an inner compartment 248, respectively.

Figure 11:
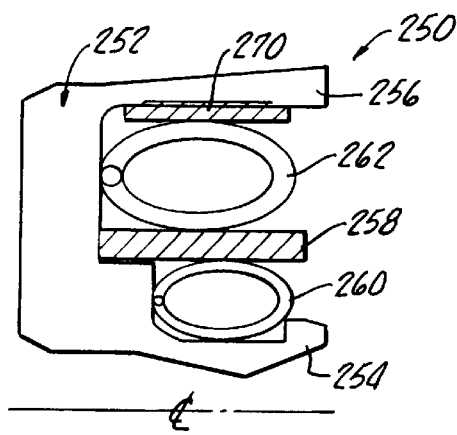

A seal assembly 250 shown in FIG. 11 includes a seal ring 252 having an inner flange 254 and an outer flange 256. A metal band 258 is disposed between an inner spring 260 and an outer spring 262 with the inner spring 260 being of smaller cross section than the outer spring 262. Also included is a second band 270, which may be plastic or metal disposed between the outer spring 262 and the outer flange 256 which provides a means for providing added loading on the outer flange 256 in order to reduce any shrinking of the outer flange 256 after being subjected to an elevated temperature. In addition, stress distribution is provided to reduce creeping of the material.

Figure 12:
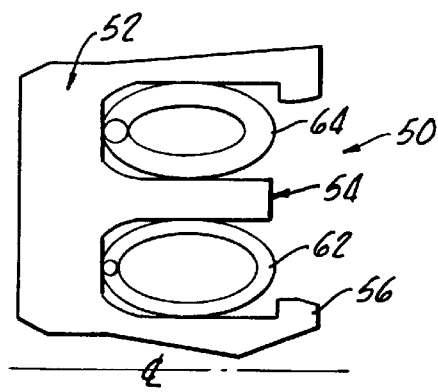

FIG. 12 is an enlarged view of the spring assembly 50 shown in FIG. 2 and hereinabove described.

Although there has been hereinabove described a particular arrangement of a seal assembly in accordance with the present invention, for the purpose of illustrating the manner in which the invention may be used for advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A seal assembly suitable for static, rotary and reciprocating sealing between a shaft and a housing, said seal assembly comprising:
    a seal ring having an annular shape with a body portion with an inside flange and an outside flange, both flanges extending axially from said body portion and establishing a seal ring cavity between the flanges;
    inside annular spring means, disposed in the cavity, for biasing the inside flange against the shaft to provide a dynamic seal therebetween;
    outside annular spring means, disposed in the cavity, for biasing said outside flange against the housing to provide a static seal therebetween and prevent rotation of the seal ring; and
    linear band means, disposed in the cavity and between the inside and outside spring means, and extending axially from said body portion and parallel to both flanges, for enabling the inside and outside spring to independently bias the inside flange and outside flange respectively.

2. The seal assembly according to claim 1 wherein said band means is fixed to the body portion of said seal ring.

3. The seal assembly according to claim 2 wherein said seal ring is formed from a metal and the band means is integral therewith.

4. The seal assembly according to claim 2 wherein said seal ring is formed from a plastic and the band means is integral therewith.

5. The seal assembly according to claim 1 wherein said band means is unattached within the cavity and includes groove means for preventing axial movement of the band means.

6. The seal assembly according to claim 5 further comprising means, defining a slot in the body portion, for limiting radial movement of said band means within said cavity.

7. The seal assembly according to claim 5 wherein said groove means comprises a first groove on one side of said band means conforming to a perimeter of the inside annular spring means and a second groove on an opposite side of said band means conforming to a perimeter of the outside annular spring means.

8. The seal assembly according to claim 1 further comprising second band means, disposed between said outside annular spring means and said outside flange, for, in combination with the outside spring means, maintaining the seal ring within the housing.

9. The seal assembly according to claim 1 wherein the outside annular spring means and the inside annular spring means have different force-deflection characteristics.

10. The seal assembly according to claim 9 wherein the outside annular spring means and the inside annular spring means are of different dimensions.

11. A seal assembly suitable for static, rotary and reciprocating sealing between a shaft and a housing, said seal assembly comprising:
    a seal ring having an annular shape with a body portion with an inside flange and an outside flange, both flanges extending axially from said body portion and establishing a cavity between the flanges;
    linear band means, disposed in said cavity and extending axially from said body portion and parallel to both flanges, for defining an inside and an outside compartment within said cavity;
    inside annular spring means, disposed in the inside compartment, for biasing the inside flange against the shaft to provide a dynamic seal therebetween; and
    outside annular spring means, disposed in the outside compartment for biasing the outside flange against the housing to provide a static seal therebetween.

12. The seal assembly according to claim 11 wherein said band means is fixed to the body portion of said seal ring.

13. The seal assembly according to claim 12 wherein said seal ring is formed from a metal and the band means is integral therewith.

14. The seal assembly according to claim 12 wherein said seal ring is formed from a plastic and the band means is integral therewith.

15. The seal assembly according to claim 11 wherein said band means is unattached within the cavity and includes groove means for preventing axial movement of the band means.

16. The seal assembly according to claim 15 wherein said groove means comprises a first groove on one side thereof conforming to a perimeter of the inside spring means and a second groove on an opposite side thereof conforming to a perimeter of the outside spring means.

17. The seal assembly according to claim 11 further comprising second band means, disposed between said outside annular spring means and said outside flange, for, in combination with the outside spring means, maintaining the seal ring within the housing.

18. The seal assembly according to claim 11 wherein the outside annular ring means and the inside annular ring means have different force-deflection characteristics.

19. The seal assembly according to claim 18 wherein the outside annular ring means and the inside annular ring means are of different dimensions.

20. The seal assembly according to claim 11 wherein the inside and outside compartments are of different sizes.

* * * * *